(12) United States Patent
Picciolo et al.

(10) Patent No.: US 8,082,286 B1
(45) Date of Patent: Dec. 20, 2011

(54) METHOD AND SYSTEM FOR SOFT-WEIGHTING A REITERATIVE ADAPTIVE SIGNAL PROCESSOR

(75) Inventors: Michael Lee Picciolo, Leesburg, VA (US); Karl Robert Gerlach, Chesapeake Beach, MD (US)

(73) Assignee: Science Applications International Corporation, San Diego, CA (US)

( * ) Notice: Subject to any disclaimer, the term of this patent is extended or adjusted under 35 U.S.C. 154(b) by 1129 days.

(21) Appl. No.: 11/727,422

(22) Filed: Mar. 26, 2007

Related U.S. Application Data

(63) Continuation-in-part of application No. 11/537,000, filed on Sep. 29, 2006, now abandoned, which is a continuation of application No. 10/126,663, filed on Apr. 22, 2002, now Pat. No. 7,167,884.

(51) Int. Cl.
*G06F 17/10* (2006.01)
(52) U.S. Cl. ........................................ 708/322; 708/305
(58) Field of Classification Search .................... 708/322
See application file for complete search history.

(56) References Cited

U.S. PATENT DOCUMENTS

| | | | |
|---|---|---|---|
| 3,876,947 A | 4/1975 | Giraudon | 455/253.2 |
| 3,892,051 A | 7/1975 | Bunker | 35/12 N |
| 4,173,759 A | 11/1979 | Bakhru | 342/382 |
| 4,259,661 A | 3/1981 | Todd | 340/146.3 AQ |
| 4,353,119 A | 10/1982 | Daniel et al. | 702/194 |
| 4,513,383 A | 4/1985 | Hackett, Jr. | 702/190 |
| 4,628,320 A | 12/1986 | Downie | 342/16 |
| 4,649,505 A | 3/1987 | Zinser, Jr. et al. | 379/406.08 |
| 4,719,466 A | 1/1988 | Farina et al. | 342/159 |
| 4,797,807 A | 1/1989 | Gerlach | 708/310 |
| H792 H | 6/1990 | Sanval et al. | 342/17 |
| 4,959,653 A | 9/1990 | Ganz | 342/17 |
| H1005 H * | 12/1991 | Gerlach | 342/378 |
| H1033 H | 3/1992 | Willey et al. | 342/17 |
| 5,142,551 A | 8/1992 | Borth et al. | 375/219 |
| 5,151,919 A | 9/1992 | Dent | 370/209 |
| 5,265,065 A | 11/1993 | Turtle | 707/4 |
| 5,267,266 A | 11/1993 | Chen | 375/232 |
| 5,285,291 A | 2/1994 | Schiller | 358/453 |
| 5,390,364 A | 2/1995 | Webster et al. | 455/506 |

(Continued)

FOREIGN PATENT DOCUMENTS

JP 04297883 A * 10/1992

OTHER PUBLICATIONS

Karl Gerlach, Cascaded Adaptive Canceler Using Loaded SMI, 2001, IEEE, pp. 710-719.*

(Continued)

*Primary Examiner* — Lewis Bullock, Jr.
*Assistant Examiner* — Kevin G Hughes
(74) *Attorney, Agent, or Firm* — King & Spalding LLP

(57) ABSTRACT

This invention is an improvement upon the basic adaptive signal processors, the Multi-Stage Wiener Filter and the cascaded canceller. The invention combines the concepts of soft weighting the adaptive weights of either type of processor disclosed herein with reiteratively processing the outputs by returning them to the input of the chosen adaptive signal processor. The combination of these functions improves the Signal to Interference plus Noise Ratio (SINR), the Probability of Detection (Pd), and/or the Bit Error Rate (BER). The invention improves statistical convergence of these types of metrics such that fewer training data samples are needed to achieve a particular satisfactory value of these metrics than would occur using traditional computational adaptive signal processors.

82 Claims, 4 Drawing Sheets

U.S. PATENT DOCUMENTS

| | | | | |
|---|---|---|---|---|
| 5,465,396 | A | * | 11/1995 | Hunsinger et al. ............... 455/61 |
| 5,511,423 | A | | 4/1996 | Sugiyama et al. ............... 73/602 |
| 5,517,122 | A | | 5/1996 | Chen .............................. 324/322 |
| 5,541,520 | A | | 7/1996 | Zai et al. ........................ 324/618 |
| 5,541,867 | A | | 7/1996 | Corry et al. .................... 708/322 |
| 5,586,066 | A | | 12/1996 | White et al. ................... 702/181 |
| 5,640,429 | A | | 6/1997 | Michels et al. ................ 375/340 |
| 5,673,210 | A | | 9/1997 | Etter ............................... 702/69 |
| 5,694,342 | A | | 12/1997 | Stein ............................. 702/190 |
| 5,694,592 | A | | 12/1997 | Driscoll ............................ 707/3 |
| 5,696,962 | A | | 12/1997 | Kupiec ............................. 707/4 |
| 5,706,013 | A | * | 1/1998 | Melvin et al. .................. 342/159 |
| 5,760,734 | A | | 6/1998 | Urkowitz ....................... 342/159 |
| 5,774,839 | A | | 6/1998 | Shlomot ........................ 704/222 |
| 5,790,588 | A | | 8/1998 | Fukawa et al. ................. 375/148 |
| 5,963,888 | A | | 10/1999 | Uhlmann et al. .............. 702/109 |
| 5,963,940 | A | | 10/1999 | Liddy et al. ........................ 707/5 |
| 6,032,113 | A | | 2/2000 | Graupe .......................... 704/201 |
| 6,041,291 | A | | 3/2000 | Yamazaki et al. ............. 702/191 |
| 6,044,336 | A | | 3/2000 | Marmarelis et al. ........... 702/190 |
| 6,058,408 | A | | 5/2000 | Fischer et al. ................. 708/322 |
| 6,121,914 | A | | 9/2000 | Cavelos et al. .................. 342/16 |
| 6,122,628 | A | | 9/2000 | Castelli et al. ...................... 707/5 |
| 6,124,828 | A | | 9/2000 | Champeau ..................... 342/379 |
| 6,130,641 | A | | 10/2000 | Kraeutner et al. ............. 342/179 |
| 6,144,937 | A | | 11/2000 | Ali ................................. 704/243 |
| 6,157,403 | A | | 12/2000 | Nagata ........................... 348/171 |
| 6,188,352 | B1 | | 2/2001 | Choi et al. ..................... 342/378 |
| 6,201,954 | B1 | | 3/2001 | Soliman ...................... 455/226.2 |
| 6,219,561 | B1 | | 4/2001 | Raleigh .......................... 455/561 |
| 6,236,862 | B1 | | 5/2001 | Erten et al. .................... 455/501 |
| 6,239,746 | B1 | | 5/2001 | Pipon et al. .................... 342/440 |
| 6,258,494 | B1 | | 7/2001 | Bourdelais et al. .............. 430/15 |
| 6,263,307 | B1 | | 7/2001 | Arslan et al. .................. 704/226 |
| 6,278,961 | B1 | | 8/2001 | Kadtke et al. ................. 702/189 |
| 6,289,046 | B1 | | 9/2001 | Takeuchi et al. .............. 375/232 |
| 6,295,520 | B1 | | 9/2001 | Tian .............................. 704/223 |
| 6,341,298 | B1 | | 1/2002 | Ilani .............................. 708/520 |
| 6,697,633 | B1 | | 2/2004 | Dogan et al. .................. 455/509 |
| 6,798,380 | B2 | * | 9/2004 | Li et al. ......................... 342/368 |
| 6,904,444 | B2 | | 6/2005 | Picciolo et al. ............... 708/322 |
| 7,099,698 | B2 | * | 8/2006 | Tarokh et al. ............... 455/562.1 |
| 7,103,537 | B2 | * | 9/2006 | Witzgall et al. ............... 704/219 |
| 7,120,657 | B2 | | 10/2006 | Ricks et al. ................... 708/322 |
| 7,167,884 | B2 | | 1/2007 | Picciolo et al. ............... 708/322 |
| 2004/0098299 | A1 | | 5/2004 | Ligon et al. ..................... 705/10 |

OTHER PUBLICATIONS

Manton and Hua, Convolutive Reduced Rank Wiener Filtering, 2001, IEEE, pp. 4001-4004.*

Guerci, et al., "Principal Components, Covariance Matrix Tapers, and the Subspace Leakage Problem," *IEEE Trans. Aerosp. Electron. Syst.*, vol. 38, No. 1, Jan. 2002, pp. 152-162.

Antonik, et al., "Implementation of Knowledge-Based Control for Space-Time Adaptive Processing," *IEEE Radar 97 Conference*, Oct. 14-16, 1997, pp. 478-482.

Reed, et al., "Rapid Convergence Rate in Adaptive Arrays," *IEEE Trans. Aerosp. Electron. Syst.*, vol. AES-10, No. 6, Nov. 1974, pp. 853-863.

Goldstein, et al., "A Multistage Representation of the Wiener Filter Based on Orthogonal Projections," *IEEE Transactions on Information Theory*, vol. 44, No. 7, Nov. 1998, pp. 2943-2959.

Guerci, et al., "Optimal and Adaptive Reduced-Rank STAP," *IEEE Transactions on Aerospace and Electronic Systems*, vol. 36, No. 2, pp. 647-663, Apr. 2000.

Ding, "A Similarity-Based Probability Model for Latent Semantic Indexing," *Proceedings of the 22nd Annual SIGIR Conference*, Berkeley, CA, Aug. 1999.

Dumais, "Automatic Cross-Linguistic Information Retrieval Using Latent Semantic Indexing," *SIGIR '96—Workshop on Cross-Linguistic Information Retrieval*, Aug. 16-23, 1996.

Dumais, "Using LSI for Information Filtering: TREC-3 Experiments," D. Harman (Ed.), *The Third Text Retrieval Conference (TREC3), National Institute of Standards and Technology Special Publication*, 1995.

Dumais, "Latent Semantic Indexing (LSI) and TREC-2," Harman (Ed.), *The Second Text Retrieval Conference (TREC2), National Institute of Standards and Technology Special Publication 500-215*, 1994, pp. 105-116.

Dumais, LSI Meets TREC: A Status Report, in D. Harman (Ed.), *The First Text Retrieval Conference (TREC1), National Institute of Standards and Technology Special Publication 500-207*, 1993, pp. 137-152.

Deerwester, et al., "Indexing by Latent Semantic Analysis," *J. Soc. For Information Science*, 41(6), pp. 391-407, Oct. 1990.

Gerlach, K., Kretschmer, F. F., Jr., "Convergence Properties of Gram-Schmidt and SMI Adaptive Algorithms," *IEEE Trans. Aerospace and Electronics Systems*, vol. 26, No. 1, Jan. 1990, pp. 44-56.

Picciolo, M. L., Gerlach, K., "Median Cascaded Canceller Using Reiterative Processing," *Proceedings of IEEE Radar Conference*, Huntsville, AL, May 5-8, 2003, pp. 71-78.

Picciolo, M., Gerlach, K., "Median Cascaded Canceller Using Reiterative Processing," *IEEE 2003 Radar Conference*, Presentation, 25 pp., 2003.

Picciolo, M. L., Schoenig, G. N., Mili, L., Gerlach, K., "Rank-Independent Convergence for Generic Robust Adaptive Cascaded Cancellers Via Reiterative Processing," *Proceedings of International IEEE Radar Conference*, Washington, DC, May 9-12, 2005, pp. 399-404.

Picciolo, M. L., "Robust Adaptive Signal Processors," Ph.D. Dissertation, Virginia Polytechnic Institute and State University, Apr. 18, 2003, 220 pp.

Picciolo, M. L., Gerlach, K., "Median Cascaded Canceller for Robust Adaptive Array Processing," *IEEE Transactions on Aerospace and Electronic Systems*, vol. 39, Issue 3, Jul. 2003, pp. 883-900.

Haykin, S., "Adaptive Filter Theory," $3^{rd}$ Edition, Prentice Hall, New Jersey, 1996 (Cover, Copyright Page, Table of Contents, Chapters 5 and 14).

Goldstein, J. S., Reed, I. S., Zulch, P. A., "Multistage Partially Adaptive STAP CFAR Detection Algorithm," *IEEE Trans. Aerospace and Elect. Syst.*, vol. 35, No. 2, Apr. 1999, pp. 645-662.

Haykin, S., "Signal Processing: Where Physics and Mathematics Meet," *IEEE Signal Proc. Magazine*, Jul. 2001, pp. 6-7.

Ricks and Goldstein, "Efficient Architectures for Implementing Adaptive Algorithms," *Proceedings of the 2000 Antenna Applications Symposium*, Allerton Park, Monticello, Illinois, pp. 29-41, Sep. 20-22, 2000.

Goldstein, J. Scott, et al, "A Reduced Rank MMSE Receiver for a DS-CDMA System in Frequency Selective Multi-Path," *IEEE Military Communications Conference*, pp. 1109-1113, Oct. 28-31, 2001.

Goldstein, J. Scott, et al, "MMSE Correlator Based Rake Receiver for DS-CDMA," *IEEE Military Communications Conference*, pp. 1418-1422, Oct. 28-31, 2001.

International Search Report for Application No. PCT/US01/26592, dated Nov. 26, 2001 (mailing date).

S. Haykin, Adaptive Filter Theory, 3rd edition, esp. pp. 194, 483, Prentice Hall, 1996.

Bernard Widrow and Samuel Stearns, Adaptive Signal Processing, Prentice Hall, 1985.

G. H. Golub and C. F. Van Loan, Matrix Computations, 3rd edition, John Hopkins University Press,(esp. pp. 18-19), with examples tabulated on pp. 254, 263, and 270, 1996.

Harold Abelson and Gerald Sussman, Structure and Interpretation of Computer Programs, MIT Press and McGraw Hill, pp. 39-40.

D. C. Ricks, and J. S. Goldstein, "Efficient architectures for implementing adaptive algorithms," Proceedings of the 2000 Antenna Applications Symposium, pp. 29-41, Allerton Park, Monticello, Illinois, Sep. 20-22, 2000.

International Preliminary Examination Report for Application No. PCT/US01/26592, dated Jun. 14, 2002 (mailing date).

Jeng-Kuang, et al., An Efficient Algorithm and Pipelined VLSI Architecture for the Maximum Likelihood Estimation of Directions of Arrival, *IEEE International Conference*, pp. 2919-2922, 1990.

Knockaert, "A Recursive Algorithm for Linear System Identification," *IEEE Trans.*, vol. 34, Issue 3, pp. 492-498, Jun. 1986.

Schneider, et al., "A Krylov Subspace Method for Large Estimation Problems," *IEE International Conference*, vol. 3, pp. 1701-1704, Mar. 1999.

Camps, et al., "Radiometric Sensitivity Computation in Aperture Synthesis Interferometric Radiometry," *IEEE Trans.*, vol. 36, pp. 680-685.

J. Scott Goldstein, J. R. Guerci and I. S. Reed, "Reduced-Rank Intelligent Signal Processing With Application to Radar, Intelligent Signal Processing," *IEEE Press*, New York, p. 465. 2001.

Preliminary Examination Report for Application No. PCT/US01/42582, dated May 28, 2002 (mailing date).

Preliminary Amendment for U.S. Appl. No. 09/933,004, filed Sep. 13, 2002.

Non-Final Office Action for U.S. Appl. No. 09/933,004 mailed Jul. 30, 2004.

Response to Non-Final Office Action mailed Jul. 30, 2004 for U.S. Appl. No. 09/933,004, filed Nov. 30, 2004.

Final Office Action for U.S. Appl. No. 09/933,004 mailed Jun. 27, 2005.

Request for Reconsideration in Response to Final Office Action mailed Jun. 27, 2005 for U.S. Appl. No. 09/933,004, filed Aug. 25, 2005.

Notice of Allowance for U.S. Appl. No. 09/933,004 mailed Oct. 25, 2005.

Request for Continued Examination with Information Disclosure Statement in Response to Notice of Allowance mailed Oct. 25, 2005 for U.S. Appl. No. 09/933,004, filed Jan. 25, 2006.

Notice of Allowance for U.S. Appl. No. 09/933,004 mailed May 24, 2006.

Notice to File Corrected Application Papers for U.S. Appl. No. 11/508,833, mailed Sep. 12, 2006.

Response to Notice to File Corrected Application Papers mailed Sep. 12, 2006 for U.S. Appl. No. 11/508,833, filed Oct. 2, 2006.

Non-Final Office Action for U.S. Appl. No. 11/508,833 mailed Jul. 16, 2007.

Response to Non-Final Office Action mailed Jul. 16, 2007 for U.S. Appl. No. 11/508,833, filed Nov. 13, 2007.

Non-Final Office Action for U.S. Appl. No. 09/974,091 mailed Feb. 16, 2005.

Reply Under 37 C.F.R. 1.111—Request for Reconsideration in Response to Non-Final Office Action mailed Feb. 16, 2005 for U.S. Appl. No. 09/974,091, filed May 2005.

Final Office Action for U.S. Appl. No. 09/974,091 mailed Jul. 18, 2005.

Request for Reconsideration in Response to Final Office Action mailed Jul. 18, 2005 for U.S. Appl. No. 09/974,091, filed Aug. 18, 2005.

Examiner Interview Summary for U.S. Appl. No. 09/974,091 mailed Sep. 14, 2005.

Non-Final Office Action for U.S. Appl. No. 09/974,091 mailed Oct. 4, 2005.

Request for Reconsideration in Response to Non-Final Office Action mailed Oct. 4, 2005 for U.S. Appl. No. 09/974,091, filed Feb. 6, 2006.

Notice of Allowance for U.S. Appl. No. 09/974,091 mailed Apr. 18, 2006.

Non-Final Office Action for U.S. Appl. No. 11/496,419 mailed Dec. 6, 2007.

Notice to File Missing Parts of NonProvisional Application for U.S. Appl. No. 10/689,765 mailed Jan. 23, 2004.

Response to Notice to File Missing Parts of Application mailed Jan. 23, 2004 for U.S. Appl. No. 10/689,765, filed Apr. 20, 2004.

Non-Final Office Action for U.S. Appl. No. 10/689,765 mailed Dec. 14, 2006.

Response to Non-Final Office Action mailed Dec. 14, 2006 for U.S. Appl. No. 10/689,765, filed Apr. 13, 2007.

Notice of Informal or Non-Responsive Amendment for U.S. Appl. No. 10/689,765 mailed May 2, 2007.

Response to Notice of Informal or Non-Responsive Amendment mailed May 2, 2007 for U.S. Appl. No. 10/689,765, filed May 14, 2007.

Ex Parte Quayle Action for U.S. Appl. No. 10/689,765 mailed Aug. 8, 2007.

Response to Ex Parte Quayle Action mailed Aug. 8, 2007 for U.S. Appl. No. 10/689,765, filed Oct. 8, 2007.

Notice of Allowance for U.S. Appl. No. 10/689,765 mailed Nov. 2, 2007.

Request for Continued Examination with Information Disclosure Statement in response to Notice of Allowance mailed Nov. 2, 2007 for U.S. Appl. No. 10/689,765, filed Feb. 1, 2008.

* cited by examiner

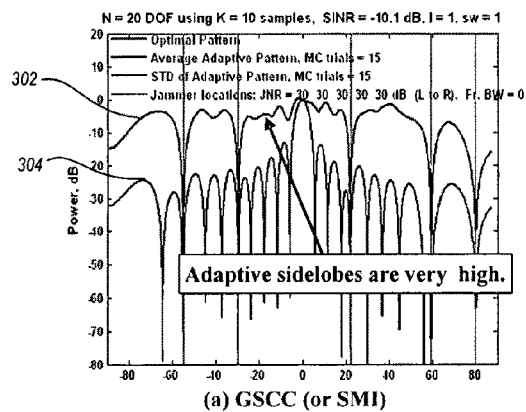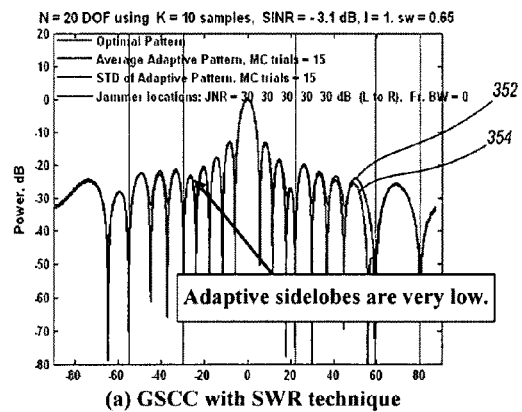
Fig. 3A
Prior Art
Fig. 3B
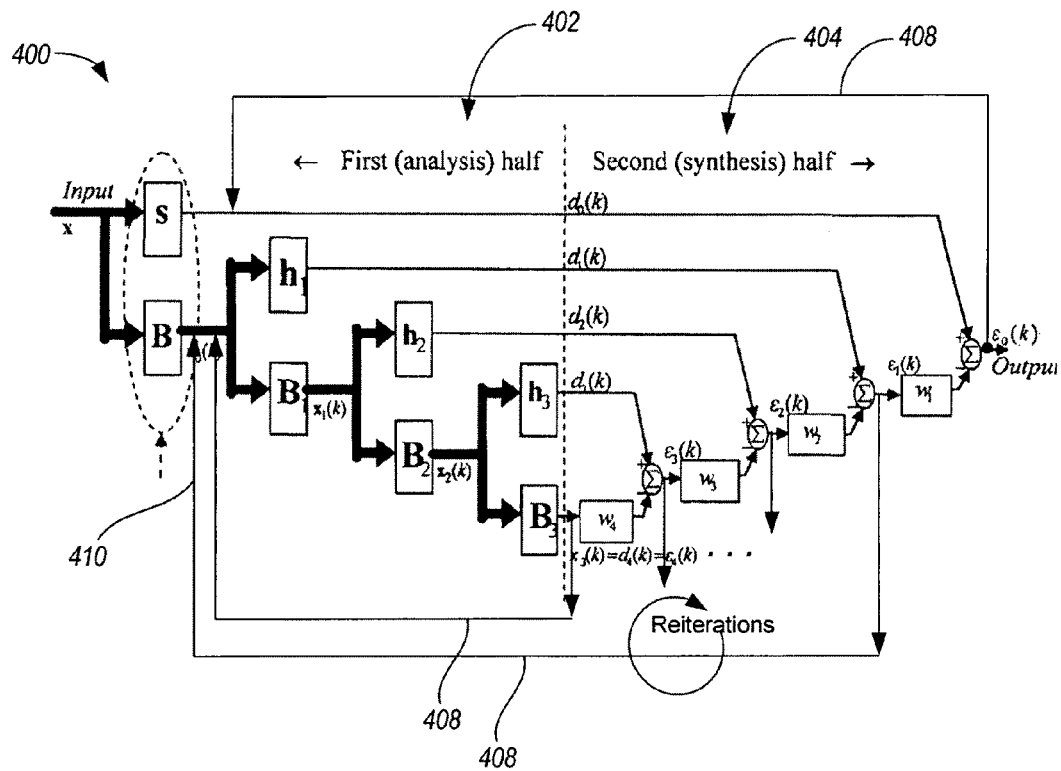
Fig. 4

(a) MWF (rank=10)

(b) MWF w/ soft weighting and reiteration (a) MWF (rank=10)

(b) MWF w/ soft weighting and reiteration

US 8,082,286 B1

METHOD AND SYSTEM FOR SOFT-WEIGHTING A REITERATIVE ADAPTIVE SIGNAL PROCESSOR

RELATED APPLICATIONS

This application is a continuation-in-Part to U.S. patent application Ser. No. 11/537,000, filed Sep. 29, 2006 now abandoned and titled "MULTISTAGE MEDIAN CASCADED CANCELLER," which is a continuation of U.S. patent application Ser. No. 10/126,663, now U.S. Pat. No. 7,167,884, entitled "MULTISTAGE MEDIAN CASCADED CANCELLER," the disclosures of which are fully incorporated herein.

FIELD OF THE INVENTION

The invention relates in general to an adaptive signal processing system. More specifically, the invention relates to an adaptive signal processing system using full and reduced rank signal processors that are insensitive to non-ideal data yet improve the convergence of standard algorithms while reiteratively processing signals with a minimum of training data.

BACKGROUND OF THE INVENTION

Adaptive signal processing systems have many applications, including radar reception, cellular telephone and other communications systems, and biomedical imaging. Adaptive signal processing systems utilize adaptive filtering to differentiate between the desired signal and the combination of interference and noise, i.e., thermal or receiver noise. An adaptive filter is defined by four aspects: the type of signals being processed, the structure that defines how the output signal of the filter is computed from its input signal, the parameters within this structure that can be iteratively changed to alter the filter's input-output relationship, and the adaptive algorithm that describes how the parameters are adjusted from one time instant to the next.

Adaptive signal processing systems are required to filter out undesirable interference and noise. Due to the lack of a priori knowledge of an external interference environment, adaptive signal processing systems require a certain amount of statistically independent "weight training" data samples to effectively estimate the input noise and interference statistics.

Noise and interference may often hinder the desired signal detection. Noise is usually described as ever-present receiver thermal noise, generally at a lower power level. Interference may be intentional jamming or unintentionally received radiation. In these applications, antenna arrays, for instance, may change their multidimensional reception patterns automatically in response to the signal environment in a way that optimizes the ratio of signal power to the combination of interference power plus noise power (SINR). Adaptive arrays are especially useful to protect radar and communication systems from interference when the directions of the interference are unknown or changing while attempting to receive a desired signal of known form. Adaptive arrays are capable of operating even when the antenna elements have arbitrary patterns, polarizations, and spacings.

In many sensor system applications, adaptive signal processing is required to remove time-varying interference signals when attempting to detect weak, desired signals, or targets. In these dynamic signal environments, the interference characteristics change rapidly, and state-of-the-art "full rank" adaptive algorithms cannot adjust the weight vector (adaptive filter) fast enough. Methods exist called "reduced rank" adaptive processors that converge their weight vectors, in terms of SINR, faster than full rank methods, however these methods often have undesirable features, such as significant computational requirements, limitations on high-volume data throughput, wider main beams, sensitive parameter adjustments with required feedback, and other "side effects". The rank generally refers to the number of interference or other noise sources for a given array system.

Adaptive processors such as Sample Matrix Inversion (SMI), or the numerically equivalent Gram-Schmidt Cascaded Canceller (GSCC), utilize multi-channel, or multi-sensor, measured input data to estimate the signal environment in order to mitigate interference and noise while preserving target energy. The ability to adapt is often required because adequate a priori knowledge of the interference and noise statistics is not available. For radar applications, for example, the interference and noise environment consists of jamming, ground clutter, and receiver noise. To form weights used in a linear adaptive processor, the interference plus noise covariance matrix often is estimated, either directly or indirectly, using measured training data from the input channels. These SMI methods are known to be equivalent to procedures that minimize least squares cost functions of the input training data to produce the adaptive weight vector. Least squares methods are well known to exhibit non-robust behavior. SMI methods are known to be optimal in several respects when the input data vectors are independent and identically distributed (i.i.d.) and Gaussian.

The SINR convergence measure of effectiveness (MOE) is the number of stationary, independent and identically distributed (i.i.d.) data samples per input sensor (i.e., snapshots), the number of weight training data, that are required so that the average SINR of the adaptive processor is nominally within 3 dB of optimum (i.e., optimum is 0 dB). It is desired to minimize the SINR convergence MOE to accommodate non-stationary data that is due to, for example, non-homogenous clutter, multiple targets, outliers, and/or a volatile jamming environment. In addition, faster convergence may reduce computations and cost. The convergence MOE of SMI or any numerically equivalent implementation of SMI, such as the GSCC, can be attained using approximately 2N i.i.d. snapshots for weight estimation in pure stationary Gaussian interference noise environments. The integer N denotes the number of degrees of freedom (DOF), or the number of input channels, or sensors, to the adaptive processor. For example, N is the number of antenna channels (i.e., antenna elements or subarrays) for a spatially adaptive array processor, and is the number of space and time channels for Space-Time Adaptive Processing (STAP) processor. SMI's 2N convergence MOE is known to be independent of any external interference covariance matrix, i.e., independent of the effective rank of the input covariance matrix, when the i.i.d. and Gaussian assumptions are strictly satisfied. Effective rank denotes the number of eigenvalues of the input sample covariance matrix that are large compared to the remaining, ideally equal, and small, eigenvalues that are usually associated with the received noise levels. This independence feature is very useful in practice since it provides the designers of adaptive radar systems with an a priori, fixed value for the number of required training snapshots (in ideal Gaussian environments) for a given system's DOF.

Reduced rank processors are a class of algorithms that converge more quickly than full rank processors. A full rank processor's convergence MOE (i.e., SMI or GSCC) often is proportional to (e.g., twice) the number of input channels, N, or degrees of freedom (DOF) (e.g. DOF=10 to 1000). A reduced rank processor's convergence MOE is generally proportional to (e.g., twice) the effective rank, R, of the input interference covariance matrix, which may be much smaller than the DOF in many interference environments (e.g., effective rank=1 to 100).

Reduced rank refers to methods whereby, in some cases, the adaptive processor converges in SINR using fewer subspace directions than full rank, where full rank corresponds to the dimension of the input data or the adaptive DOF often denoted as the variable N. In all cases, optimal, desired convergence occurs in near 2N training samples for full rank processors and less than 2N for reduced rank processors.

A soft weighting processing technique is desired that can be reiteratively applied to adaptive signal processor algorithms to produce adaptive convergence rates that are as fast or faster than full rank processing algorithms. One such exemplary full rank algorithm has been described in U.S. Pat. No. 6,904,444 Picciolo, Gerlach, and Goldstein, entitled "PSUEDO-MEDIAN CASCADED CANCELLER." Another such algorithm is the Gram-Schmidt Cascaded Canceller, and any other generic cascaded canceller algorithm, whether in full or reduced rank form, may also be implemented to make use of the invention. Examples of generic cascaded cancellers are referenced and may be found in Picciolo, M. L., Schoenig, G. N., Mili, L., Gerlach, K., "Rank-Independent Convergence For Generic Robust Adaptive Cascaded Cancellers Via Reiterative Processing", Proceedings of IEEE International Radar Conference, Washington, D.C., May 9-12, 2005, pp. 399-404, and Picciolo, M., "Robust Adaptive Signal Processors", PhD Dissertation, Virginia Tech, Apr. 18, 2003. Such a processing technique may also be applied to reduced rank algorithms, such as multi-stage median cascaded canceller, which has been described in U.S. Pat. No. 7,167,884 to Picciolo, Gerlach, and Goldstein, entitled "MULTI-STAGE MEDIAN CASCADED CANCELLER," to further improve convergence. Another exemplary algorithm is a Multi-Stage Weiner Filer (MWF), which may be implemented with Gram-Schmidt weighting in its synthesis stage.

It is desired to have an algorithm that performs superior to full rank and reduced rank processors in practice when ideal assumptions for the input training data are violated. One such reduced rank processor that performs poorly with non-ideal training data is the FML (Fast Maximum Likelihood), which involves forming the eigenvalues/eigenvectors of the sample covariance matrix of the input data, and selecting those eigenvalues at or below the thermal noise level to be replaced by the noise power level value, and then forming an inverse matrix with the set of all eigenvectors and the set of (partially modified) eigenvalues as described by M. Steiner, and K. Gerlach, "Fast Converging Adaptive Processor For A Structured Covariance Matrix", IEEE Trans. Aerospace and Elect. Syst., Vol. 36, No. 4, October 2000, pp. 1115-1126. Another such processor is the PCI (Principal Components' Inverse), which involves forming the eigenvalues/eigenvectors of the sample covariance matrix of the input data, and selecting those eigenvectors associated with the largest eigenvalues, and forming an inverse matrix with that subset of eigenvectors and associated eigenvalues as described by J. R. Guerci and J. S. Bergin in "Principal Components, Covariance Matrix Tapers, and the Subspace Leakage Problem", IEEE Trans. Aerospace and Electronic Systems, Vol. 38 No. 1, January 2002, pp. 152-162.

It is further desired to have an algorithm that is simple, computationally fast, and significantly improves the convergence rate of full and reduced rank processors such as cascaded cancellers and MWFs in terms of important metrics such as SINR, Probability of Detection (Pd), and Bit Error Rate (BER). It is desired to achieve flexibility for adaptive processing applications that require fast convergence (due to low sample support and/or computational restrictions), low adaptive sidelobes, and high adaptive filter resolution (i.e., high number in input channels or degrees of freedom).

SUMMARY OF THE INVENTION

The present invention provides an adaptive signal processing method and system that uses a soft-weight that may be reiteratively applied to full and reduced rank algorithms, such as cascaded cancellers or an MWF to improve the results of an adaptive signal processor in terms of SINR, Probability of Detection, and/or Bit Error Rate. Specifically, the invention improves the statistical convergence rate of these types of metrics such that fewer training data samples, less than 2N, are needed to achieve a particular satisfactory value of these metrics than would occur by using conventional adaptive processors instead. This is an important purpose because sufficient numbers of high quality (i.e., "stationary") training samples are not always available from the measured data.

With this invention, algorithm designers are free to use new canceller algorithms tailored to the data environment at hand, in order, for example, to optimize filter performance to non-Gaussian/non-stationary input statistics, add features to compensate for multiple targets and/or outliers contaminating training data, to improve numerical efficiency, etc. . . . , all-the-while reducing the number of training samples needed for reduced rank SINR convergence.

In preferred embodiments, this invention applies a soft weight value to a standard weight of a cascaded canceller. For a Gram-Schmidt cascaded canceller, the Gram-Schmidt weight is multiplied by the soft-weight value to produce the desired results. For any other cascaded canceller, the adaptive weight, whether Gram-Schmidt or another weight, value is multiplied by the soft-weight value. For a Multi-Stage Weiner Filter with Gram-Schmidt weights applied to the synthesis stage, the adaptive, Gram-Schmidt weight is multiplied by the soft-weight value. In certain embodiments, such as the multi-stage median cascaded canceller, pseudo-median cascaded canceller, Gram-Schmidt cascaded canceller, or any other generic cascaded canceller, the soft weight value may be reiteratively applied to further improve the convergence and produce reduced-rank characteristics.

A preferred embodiment of the invention provides a method for determining a soft-weight value to be applied to an adaptive signal processing algorithm comprising the steps of: i) selecting a value; ii) generating a data set of training values; iii) providing an adaptive signal processor simulator; iv) inputting the training values into the simulator, v) inputting the selected value into the simulator; vi) measuring a signal power output value of the simulator; vii) varying the selected value; and viii) repeating steps i)-vii) so long as the measured signal power output value decreases.

A further preferred embodiment of the invention provides a method wherein varying the selected value further comprises choosing the selected value from the range 0 to 2.

A further preferred embodiment of the invention provides a method wherein the selected value comprises the soft weight value.

A further preferred embodiment of the invention provides a method wherein generating a data set of training values further comprises producing a first data matrix of size defined by a number of degrees of freedom [N] of a sensor input array and twice a minimum expected effective rank, [$R_{min}$], corresponding to a simulated interference plus noise environment.

A further preferred embodiment of the invention provides a method wherein generating a data set of training values further comprises producing a second data matrix of size defined by a number of degrees of freedom [N] of a sensor input array and twice a maximum expected effective rank, [$R_{max}$], corresponding to a simulated interference plus noise environment.

A further preferred embodiment of the invention provides a method wherein the soft weight value is selected such that a signal to interference power plus noise ratio [SINR] converges to an average of −3 dB from optimal in less than 2N training samples, where N is the number of degrees of freedom.

A further preferred embodiment of the invention provides a method wherein the simulator simulates a pseudo-median cascaded canceller adaptive signal processor.

A further preferred embodiment of the invention provides a method wherein at least one adaptive weight of the pseudo-median cascaded canceller is multiplied by the selected value.

A further preferred embodiment of the invention provides a method wherein the simulator simulates a Gram-Schmidt cascaded canceller algorithm.

A further preferred embodiment of the invention provides a method wherein at least one Gram-Schmidt weight of the Gram-Schmidt cascaded canceller is multiplied by the selected value.

A further preferred embodiment of the invention provides a method wherein the simulator simulates a generic cascaded canceller algorithm.

A further preferred embodiment of the invention provides a method wherein at least one adaptive weight of the generic cascaded canceller is multiplied by the selected value.

A further preferred embodiment of the invention provides a method wherein the simulator simulates a multi-stage median cascaded canceller.

A further preferred embodiment of the invention provides a method wherein at least one adaptive weight of the multi-stage median cascaded canceller is multiplied by the selected value.

A further preferred embodiment of the invention provides a method wherein the simulator simulates a Multi-Stage Weiner Filter algorithm.

A further preferred embodiment of the invention provides a method wherein the Multi-Stage Weiner Filter comprises a plurality of stages such that the number of stages is selected to be equal to an effective rank of an interference plus noise environment.

A further preferred embodiment of the invention provides a method wherein the Multi-Stage Weiner Filter comprises a plurality of stages such that the number of stages is selected to be greater than a minimum effective rank of an interference plus noise environment.

A further preferred embodiment of the invention provides a method wherein the Multi-Stage Weiner Filter comprises a plurality of stages such that the number of stages required for optimal convergence is less than the number of degrees of freedom.

A further preferred embodiment of the invention provides a method wherein at least one Weiner weight is multiplied by the selected value.

A further preferred embodiment of the invention provides a method wherein at least one Gram-Schmidt weight is applied in the synthesis stage.

A further preferred embodiment of the invention provides a method wherein the soft weight value is increased until the measured signal power output value reaches an unacceptable power output.

Another preferred embodiment of the invention provides a method for reiteratively applying a soft-weight value to an adaptive signal processor comprising: i) taking a plurality of measurements in an interference plus noise data environment; ii) inputting each of the plurality of measurements into an input of an adaptive signal processor algorithm; iii) applying a soft weight value to a plurality of building blocks of the adaptive signal processor algorithm; iv) determining a main channel column output of the adaptive signal processor algorithm for each of the plurality of measurements input into the adaptive signal processor algorithm; v) squaring the main channel column output of the adaptive signal processor algorithm for each of the plurality of measurements; vi) storing each squared value for each of the plurality of measurements; vii) determining a representative average value of the stored squared values once each of the plurality of measurements has been input into the adaptive signal processor algorithm; viii) performing each of steps i) through vii) until the representative average value increases from the prior iteration; counting a number of iterations required to perform steps i) to vii) until the representative average value increases from the prior iteration; ix) and storing one less than the number of iterations required to perform the steps i) to vii) prior to the representative average value increasing from the prior iteration.

A further preferred embodiment of the invention provides a method wherein the plurality of measurements comprise measurements from each of a plurality of sensor inputs.

A further preferred embodiment of the invention provides a method, which further comprising retrieving the stored number of iterations.

A further preferred embodiment of the invention provides a method wherein applying the soft weight value includes determining the soft weight value.

A further preferred embodiment of the invention provides a method wherein determining a soft weight value further comprises the steps of: i) selecting a value; ii) generating a data set of training values; iii) providing an adaptive signal processor simulator; iv) inputting the training values into the simulator, v) inputting the selected value into the simulator; vi) measuring a signal power output value of the simulator; vii) varying the selected value; and viii) repeating steps i)-vii) so long as the measured signal power output value decreases.

A further preferred embodiment of the invention provides a method wherein varying the selected value further comprises choosing the selected value from the range 0 to 2.

A further preferred embodiment of the invention provides a method wherein the selected value is the soft weight value.

A further preferred embodiment of the invention provides a method wherein generating a data set of training values further comprises producing a first data matrix of size defined by a number of degrees of freedom [N] of a sensor input array and twice a minimum expected effective rank, [$R_{min}$], corresponding to a simulated interference plus noise environment.

A further preferred embodiment of the invention provides a method wherein generating a data set of training values further comprises producing a second data matrix of size defined by a number of degrees of freedom [N] of a sensor input array and twice a maximum expected effective rank, [$R_{max}$], corresponding to a simulated interference plus noise environment.

A further preferred embodiment of the invention provides a method wherein the soft weight value is selected such that a signal to power plus noise ratio [SINR] converges to an average of −3 dB from optimal in less than 2N training samples, where N is the number of degrees of freedom.

A further preferred embodiment of the invention provides a method wherein the simulator simulates a cascaded canceller.

A further preferred embodiment of the invention provides a method wherein the cascaded canceller comprises a pseudo-median cascaded canceller.

A further preferred embodiment of the invention provides a method wherein at least one adaptive weight of the pseudo-median cascaded canceller is multiplied by the selected value.

A further preferred embodiment of the invention provides a method wherein the cascaded canceller comprises a Gram-Schmidt cascaded canceller algorithm.

A further preferred embodiment of the invention provides a method wherein at least one Gram-Schmidt weight of the Gram-Schmidt cascaded canceller is multiplied by the selected value.

A further preferred embodiment of the invention provides a method wherein the cascaded canceller comprises a generic cascaded canceller algorithm.

A further preferred embodiment of the invention provides a method wherein at least one adaptive weight of the generic cascaded canceller is multiplied by the selected value.

A further preferred embodiment of the invention provides a method wherein the cascaded canceller comprises a multi-stage median cascaded canceller algorithm.

A further preferred embodiment of the invention provides a method wherein at least one adaptive weight of the multi-stage median cascaded canceller is multiplied by the selected value.

A further preferred embodiment of the invention provides a method wherein the simulator simulates a Multi-Stage Weiner Filter algorithm.

A further preferred embodiment of the invention provides a method wherein the Multi-Stage Weiner Filter comprises a plurality of stages such that the number of stages is selected to be equal to an effective rank of an interference environment.

A further preferred embodiment of the invention provides a method wherein the Multi-Stage Weiner Filter comprises a plurality of stages such that the number of stages is selected to be greater than a minimum effective rank of an interference environment.

A further preferred embodiment of the invention provides a method wherein the Multi-Stage Weiner Filter comprises a plurality of stages such that the number of stages required for optimal convergence is less than the number of degrees of freedom.

A further preferred embodiment of the invention provides a method wherein at least one Weiner weight is multiplied by the selected value.

A further preferred embodiment of the invention provides a method wherein at least one Gram-Schmidt weight is applied in the synthesis stage.

A further preferred embodiment of the invention provides a method wherein at least one Gram-Schmidt weight is multiplied by the selected value.

A further preferred embodiment of the invention provides a method wherein the soft weight value is increased until the measured signal power output value reaches an unacceptable power output.

Another preferred embodiment of the invention provides a system for reiteratively applying a soft-weight value, comprising: a plurality of sensor inputs for measuring signals within an interference plus noise environment with a variable effective rank; a filter comprising an adaptive signal processor; a controller to perform the following steps: input the measured signals into the filter; apply a soft weight value to the filter; compute an output of the adaptive signal processor; a memory means; and an output means.

A further preferred embodiment of the invention provides a system wherein a plurality of degrees of freedom provided by the sensor inputs provides the measured target signals.

A further preferred embodiment of the invention provides a system wherein the memory means has stored upon it a number of iterations.

A further preferred embodiment of the invention provides a system wherein the controller retrieves from the memory means a stored number of iterations, such that the measured signals are input into the filter a number of times as specified by the number of iterations.

A further preferred embodiment of the invention provides a system wherein the adaptive signal processor is a Gram-Schmidt Cascaded Canceller.

A further preferred embodiment of the invention provides a system wherein the controller applies the soft weight value by multiplying at least one Gram-Schmidt weight of the Gram-Schmidt cascade canceller by the soft weight value.

A further preferred embodiment of the invention provides a system wherein the adaptive signal processor is a multi-stage median cascaded canceller.

A further preferred embodiment of the invention provides a system wherein the controller applies the soft weight value by multiplying at least one adaptive weight of the multi-stage median cascaded canceller by the soft weight value.

A further preferred embodiment of the invention provides a system wherein the adaptive signal processor is a generic cascaded canceller.

A further preferred embodiment of the invention provides a system wherein the controller applies the soft weight value by multiplying at least one adaptive weight of the generic cascaded canceller by the soft weight value.

A further preferred embodiment of the invention provides a system wherein the adaptive signal processor is a pseudo-median cascaded canceller.

A further preferred embodiment of the invention provides a system wherein the controller applies the soft weight value by multiplying at least one adaptive weight of the pseudo-median cascaded canceller by the soft weight value.

A further preferred embodiment of the invention provides a system wherein the adaptive signal processor is a Multi-Stage Weiner filter.

A further preferred embodiment of the invention provides a system wherein the Multi-Stage Weiner filter comprises a pre-determined number of stages.

A further preferred embodiment of the invention provides a system wherein the Multi-Stage Weiner Filter comprises a plurality of stages such that the number of stages is selected to be equal to an effective rank of an interference plus noise environment.

A further preferred embodiment of the invention provides a system wherein the Multi-Stage Weiner Filter comprises a plurality of stages such that the number of stages is selected to be greater than a minimum effective rank of an interference plus noise environment.

A further preferred embodiment of the invention provides a system wherein the Multi-Stage Weiner Filter comprises a plurality of stages such that the number of stages required for optimal convergence is less than the number of degrees of freedom.

A further preferred embodiment of the invention provides a system wherein the controller applies the soft weight value by multiplying at least one Weiner weight of the Multi-stage Weiner Filter by the soft weight value.

A further preferred embodiment of the invention provides a system wherein at least one Gram-Schmidt weight is applied to the synthesis stage.

A further preferred embodiment of the invention provides a system wherein the controller applies the soft weight value by multiplying at least one Gram-Schmidt weight of the Multi-Stage Weiner Filter by the soft weight value.

Another preferred embodiment of the invention provides a method for adaptive signal processing, comprising: measuring a signal in an interference plus noise environment; inputting the measured signal into a filter algorithm; filtering the measured signal to eliminate interference; applying a soft weight to the algorithm; and determining the filter's output.

A further preferred embodiment of the invention provides a method wherein the measured signal comprises a target signal, an additive noise, and an interference.

A further preferred embodiment of the invention provides a method wherein the filtering comprises a cascaded canceller algorithm.

A further preferred embodiment of the invention provides a method wherein the cascaded canceller algorithm is a Gram-Schmidt cascaded canceller algorithm.

A further preferred embodiment of the invention provides a method wherein applying the soft weight value further comprises multiplying a Gram-Schmidt weight by the soft weight value.

A further preferred embodiment of the invention provides a method wherein the cascaded canceller algorithm is a pseudo-median cascaded canceller algorithm.

A further preferred embodiment of the invention provides a method wherein the cascaded canceller algorithm is a multi-stage median cascaded canceller.

A further preferred embodiment of the invention provides a method wherein the cascaded canceller algorithm is a generic cascaded canceller algorithm.

A further preferred embodiment of the invention provides a method wherein applying the soft weight value further comprises multiplying an adaptive weight by the soft weight value.

A further preferred embodiment of the invention provides a method wherein the filtering comprises a Multi-Stage Weiner Filter algorithm.

A further preferred embodiment of the invention provides a method wherein applying the soft weight value further comprises multiplying a Weiner weight by the soft weight value.

A further preferred embodiment of the invention provides a method wherein the filtering further comprises applying at least one Gram-Schmidt weight in the synthesis stage.

A further preferred embodiment of the invention provides a method wherein applying the soft weight value further comprises multiplying the Gram-Schmidt weight by the soft weight value.

A further preferred embodiment of the invention provides a method wherein the applying a soft weight value further comprises selecting a soft weight value between 0 and 2.

A further preferred embodiment of the invention provides a method wherein applying the soft weight value further comprises selecting a soft weight value such that a signal to power plus noise ratio [SINR] converges to an average of −3 dB from optimal in less than 2N training samples, where N is the number of degrees of freedom.

A further preferred embodiment of the invention provides a method wherein selecting a soft weight value further comprises selecting a value such that adaptive sidelobe heights are low.

Another preferred embodiment of the invention provides an adaptive signal processor comprising: a filter; a soft weight generator; and an output.

A further preferred embodiment of the invention provides an adaptive signal processor wherein the filter further comprises an input from the soft weight generator.

A further preferred embodiment of the invention provides an adaptive signal processor wherein the soft weight generator generates a soft weight value between 0 and 2.

A further preferred embodiment of the invention provides an adaptive signal processor wherein the filter further comprises a cascaded canceller that applies the soft weight value.

A further preferred embodiment of the invention provides an adaptive signal processor wherein the cascaded canceller further comprises a Gram-Schmidt cascaded canceller.

A further preferred embodiment of the invention provides an adaptive signal processor wherein applying the soft weight value further comprises multiplying a Gram-Schmidt weight by the soft weight value.

A further preferred embodiment of the invention provides an adaptive signal processor wherein the cascaded canceller further comprises a pseudo-median cascaded canceller.

A further preferred embodiment of the invention provides an adaptive signal processor wherein the cascaded canceller further comprises a median multi-stage cascaded canceller.

A further preferred embodiment of the invention provides an adaptive signal processor wherein the cascaded canceller further comprises a generic cascaded canceller.

A further preferred embodiment of the invention provides an adaptive signal processor wherein applying a soft weight value further comprises multiplying the adaptive weight by the soft weight value.

A further preferred embodiment of the invention provides an adaptive signal processor wherein the filter comprises a Multi-stage Weiner filter that applies the soft weight value.

A further preferred embodiment of the invention provides an adaptive signal processor wherein the Multi-Stage Weiner Filter comprises a plurality of stages such that the number of stages is selected to be equal to an effective rank of an interference plus noise environment.

A further preferred embodiment of the invention provides an adaptive signal processor wherein the Multi-Stage Weiner Filter comprises a plurality of stages such that the number of stages is selected to be greater than a minimum effective rank of an interference plus noise environment.

A further preferred embodiment of the invention provides an adaptive signal processor wherein the Multi-Stage Weiner Filter comprises a plurality of stages such that the number of stages required for optimal convergence is less than the number of degrees of freedom.

A further preferred embodiment of the invention provides an adaptive signal processor wherein at least one Gram-Schmidt weight is applied in the synthesis stage.

A further preferred embodiment of the invention provides an adaptive signal processor wherein applying the soft weight value further comprises multiplying the Gram-Schmidt weight by the soft weight value.

A further preferred embodiment of the invention provides an adaptive signal processor wherein applying the soft weight value further comprises multiplying the Weiner weight by the soft weight value.

A further preferred embodiment of the invention provides an adaptive signal processor wherein the soft weight value is selected such that a signal to power plus noise ratio [SINR] converges to an average of −3 dB from optimal in less than 2N training samples, where N is the number of degrees of freedom.

A further preferred embodiment of the invention provides an adaptive signal processor wherein the soft weight generator generates a soft weight value such that adaptive sidelobe heights are low.

Other advantages and features of the invention will become apparent from the following detailed description of the preferred embodiments and the accompanying drawings.

BRIEF DESCRIPTION OF THE DRAWINGS

FIG. 3A shows prior art sidelobe levels of a GSCC or SMI adaptive signal processor, with no soft weighting or reiteration algorithms applied, compared with the optimum, desired levels.

FIG. 3B shows sidelobe levels of a GSCC or SMI adaptive signal processor, with soft weighting and reiteration algorithms applied, compared with the optimum, desired levels.

FIG. 4 shows a Multi-Stage Weiner Filter (MWF) with the inventive soft weights and reiteration algorithms applied.

DETAILED DESCRIPTION OF THE PREFERRED EMBODIMENTS

The invention is a new processing technique for adaptive signal processors. An adaptive signal processor in accordance with this invention may be equivalently implemented as a cascaded canceller via the Gram-Schmidt cascaded canceller algorithm, a median cascaded canceller, a pseudo-median cascaded canceller, or any other generic cascaded canceller methodology. An adaptive signal processor may also be implemented as an MWF, hence the invention has broad application. The invention preferably creates the output characteristics of reduced rank adaptive processors from full rank processor, or further improves reduced rank characteristics, by applying soft-weight values. Reiteratively applying the soft-weight values to the preferred embodiments may also improve convergence and provide additional reduced rank characteristics. Reduced rank refers to methods whereby the adaptive processor converges in SINR, and requires fewer training data, often proportional to the number of interference sources, than full rank, where full rank corresponds to the case of using the full rank dimension of the input data. The full dimension corresponds to the number of sensor inputs in an array, often denoted as the variable N. Input sensors provide the measurement data that is input to and processed by the adaptive signal processor. Examples of input sensors are, without limitation, antennae, charge-couple devices, user data-input devices (such as a computer keyboard), electro-optical sensors, and/or hyper-spectral sensors, which form virtual data.

Figures 1A, 1B:
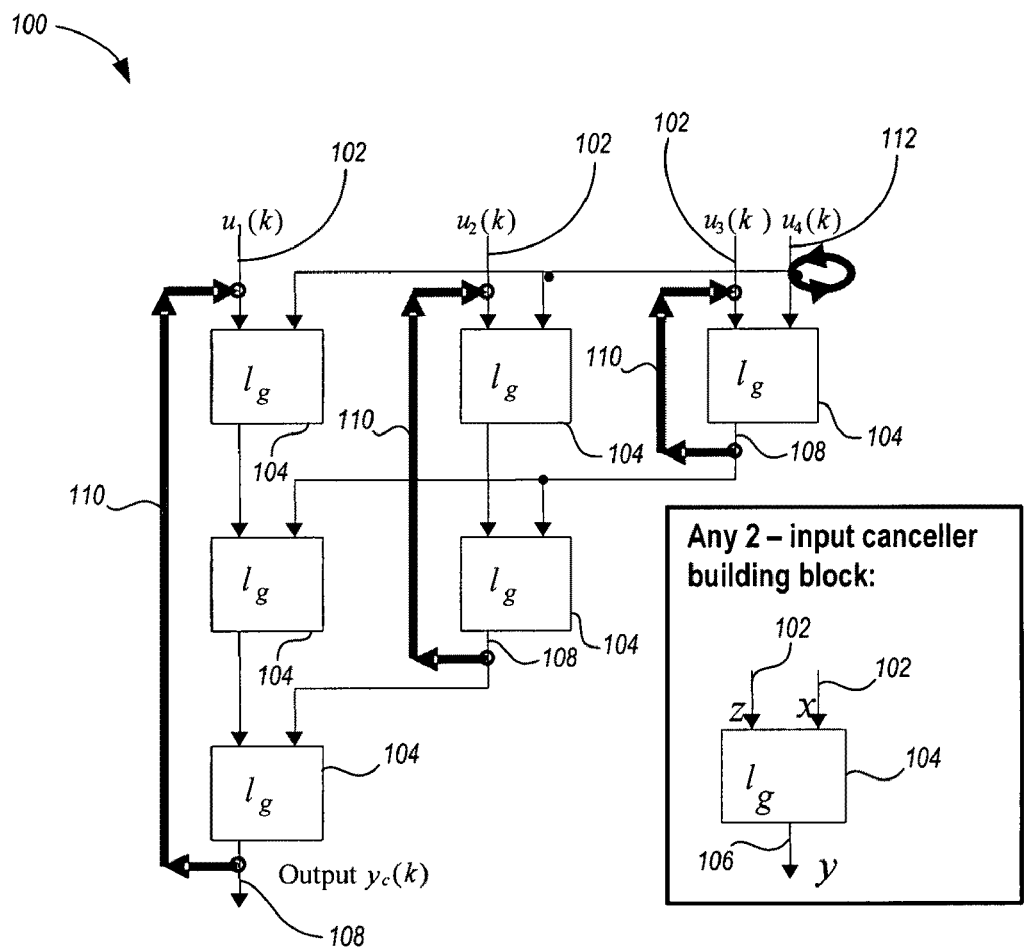
FIG. 1A shows a generic reiterative cascaded canceller (RCC) where output channels are directed back to the input channels to improve SINR convergence performance in accordance of the present invention.
FIG. 1B shows any single building block canceller within the RCC structure shown in FIG. 1A.

Turning now to FIG. 1A, which depicts the signal flow for reiteratively applying a soft weight value to a generic cascaded canceller 100, the input signal 102 is applied to each building block 104 of the cascaded canceller as shown in FIG. 1B. It should be understood by one of ordinary skill in the art that the number of inputs is exemplary, only, and generally any number of inputs are possible. Each building block 104 may perform the complex conjugation of one of the input signals 102 with the multiplication of the conjugated adaptive weight value, $w_g$, and the soft weight value or conjugated soft weight value when the soft-weight value is complex, $w_{sw}$, to produce the output 106, y, $y=z-(w_{sw} w_g)^*x$, of each building block 104. Each building block 104 may also apply the soft weight without conjugation. The cascaded canceller 100 may be comprised of a single or possibly multiple adaptive cancellers, collectively considered a single linear adaptive processor. Applying the soft weight value, $w_{sw}$, along with processing the input signals reiteratively by returning 110 the output channels, y, 108 back 110 to the inputs 102 results in an improved SINR, Probability of Detection, and BER. Input 112 is processed specially and input back to itself.

No particular algorithm is required to be used in each canceller building block. The invention may use any algorithm that either perfectly decorrelates (e.g., Gram Schmidt) or partially decorrelates (e.g., Median Cascaded Canceller or any other generic cascaded canceller) the input data channels. Once the baseline adaptive algorithm or algorithms is or are chosen, adaptive weights of the algorithm are then each soft-weighted themselves by a generally complex or real number prior to being applied.

Reiterative processing refers to either 1) the case where one cascaded canceller structure is used and its outputs are redirected back 110 into the inputs one or more times, I, (I>=1) in order to improve the form of the output data for any set of valuable purposes, or 2) the case where multiple cancellers are used in cascade to effectively mimic re-directing the outputs back through the input to achieve the same purposes. Reiteration is occurring when I is greater than one. Soft-weighting refers to modifying the adaptive weights prior to application of those weights by multiplying the adaptive weights by generally complex scalar values in order to change their values. A soft weight value is selected between 0 and 2 and applied to the filter structure. Illustratively, a number of training values corresponding to twice the maximum expected effective rank are developed by a data simulator (e.g., randomly selected data based on patterns in an interference plus noise environment). A measured, or primary, data set is combined with the training data values in a data matrix and input into the processor in order to train the adaptive weights while contemporaneously also applying the soft weight value. This value is then varied through a number of iterations until the desired output metrics for the selected filter are obtained. The instantaneous power output of the selected filter is measured and squared for each primary data input. A representative average of the squared instantaneous power outputs is taken. A representative average may be a mean, a median, a trim mean, a straight average, or any other average of the squared values that would be understood by one of ordinary skill in the art. The selected soft weight value is then increased as the primary data is input into the filter, with each primary data set requiring an individual iteration, until an undesirable power output occurs. An undesirable power output is determined by measuring and comparing the output power of the primary data and subsequent iterations. When the power output measurement difference between a subsequent and its directly preceding iteration is 1 dB, this is the soft weight value that should be used. Once the adaptive weights are modified, the invention produces superior performance in terms of the prescribed desired metrics. Although it is not necessary to use reiteration in every case, this feature further reduces the number of required training samples of the overall processor.

Figures 2A, 2B:
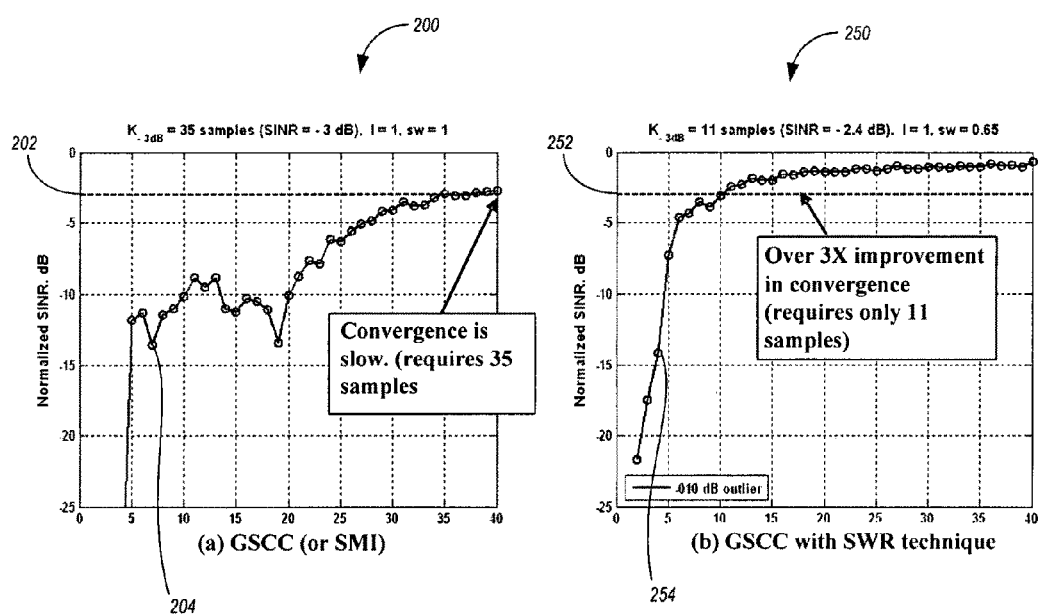
FIG. 2A shows a prior art Gram-Schmidt Cascaded Canceller (GSCC), or SMI, convergence curve for various target outlier power levels with no soft weighting or reiteration.
FIG. 2B shows a GSCC or SMI convergence curve for various target outlier power levels with the soft weighting and reiteration algorithms applied.

Turning to FIGS. 2A and 2B, the statistical convergence of the processor is improved. FIGS. 2A and 2B are graphical demonstrations of an antenna array of twenty (20) antennae and five (5) barrage jammers (e.g., interference sources). The graphs are plots of the average performance when random data samples are input into the processor. FIG. 2A is the prior art convergence graph 200 of the number of training samples compared with the normalized SINR for a GSCC without the application of a soft-weight value. To achieve SINR convergence 202 to within 3 dB of the optimal (i.e., 0 db, and, therefore, a convergence of −3 dB), the traditional Gram Schmidt cascaded canceller requires thirty-five (35) training samples 204 for this example. In comparison, FIG. 2B is a graphical demonstration 250 of the same system and input data with the soft weighting factor and reiteration applied. The convergence 252 to the −3 dB range after applying the soft weight and reiterative processing to the traditional Gram-Schmidt cascaded canceller is drastically reduced. The application of the invention requires only eleven (11) training samples 254 for the system with the same input data. When the number of antennae in the array (the Degrees of Freedom, or number of overall signal inputs) increases even more, the number of training samples required is drastically reduced from the number that would be required without using soft weights and reiteration.

FIGS. 3A and 3B are graphical representations of the adaptive sidelobe pattern improvements of the soft weighting and reiterative algorithms as applied to the traditional Gram Schmidt cascaded canceller. The graphs are plots of the average performance when random data samples are input into the processor. The graph represents array gain patterns as a function of the azimuth angle relative to the antenna array axis. As shown in FIG. 3A, the sidelobes 302 for the GSCC without application of the reiterative and soft weighting algorithms are substantially higher than and divergent from the optimum 304. FIG. 3B is the resulting graph of the sidelobes 352 after the soft weighting and reiterative algorithms have been applied. As can be seen, the sidelobe pattern nearly matches the optimum 354 levels. This reduction of the sidelobe levels reduces the amount of uncancelled interference passed on by the filters and greatly reduces the number of false alarms.

FIG. 4 is a representation of a Multi-stage Weiner Filter (MWF) 400. The MWF 400 is an adaptive signal processor that may operate to provide reduced rank processing. The analysis stage 402 decomposes the input data vector matrix into its Krylov subspaces. The synthesis stage 404 subtracts, using a Weiner filter equivalent 406, the correlated interference from the $d_o$ channel using a subset of the generated Krylov bases. Using a number of Krylov bases less than the number of Degrees of Freedom, or number of antennae in the array, allows the MWF to operate as a reduced rank processor. When soft-weighting is applied to the Gram-Schmidt, or synthesis, stage 404, the modified MWF may converge faster, especially if the number of Krylov bases originally chosen was too large. The soft-weight value, $w_{sw}$, is multiplied with the adaptive weight value, or Weiner weight, $w_i$, to achieve a weighted value, $w'_i = w_i w_{sw}$, that is applied at each stage of the synthesis half 404 of the filtering process, $X_{n-1}(k) = \epsilon_n(k)$, thus the output is $\epsilon_n(k)$, but the output of interest in most applications is $\epsilon_o(k)$ after the final iteration is completed. To apply the reiterative algorithm, the output of the filter 408 is then returned to the input 410. The number of necessary iterations may be calculated during the operation of the processor after the soft weight factor is determined using all off-line simulations with simulated training data. Using actual data, the processing through the MWF 400 is accomplished until the power level of the output ceases to decrease and begins to increase. The soft weight value, $w_{sw}$, may be any complex number that provides a convergence benefit to the overall adaptive canceller. The soft weight applied to each MWF Wiener weight, $w_i$, may be chosen to be real, imaginary, or complex and may be generally unique to each MWF Wiener weight.

This embodiment uses a standard MWF as a baseline architecture. However it is not required to use the standard MWF Wiener algorithm for its adaptive weight algorithm in each building block in the synthesis stage. In fact, the invention may use any algorithm (including the MWF or Gram-Schmidt algorithm) that either perfectly decorrelates (e.g., Gram Schmidt) or partially decorrelates (e.g., Median Cascaded Canceller or any other generic cascaded canceller algorithm) the input data channels. Once the baseline adaptive algorithm or algorithms is or are chosen, adaptive weights are then each soft weighed themselves by a generally complex or real number prior to being applied. For this embodiment, soft-weighting refers to modifying the MWF Wiener weights prior to application of those weights by multiplying the said adaptive weights by generally complex scalar values in order to change their values. Once the adaptive weights are modified, the invention produces superior performance in terms of the metrics desired. It is not necessary to use reiterative processing in every case; however, this feature further reduces the training data of the processor.

Figure 5A:
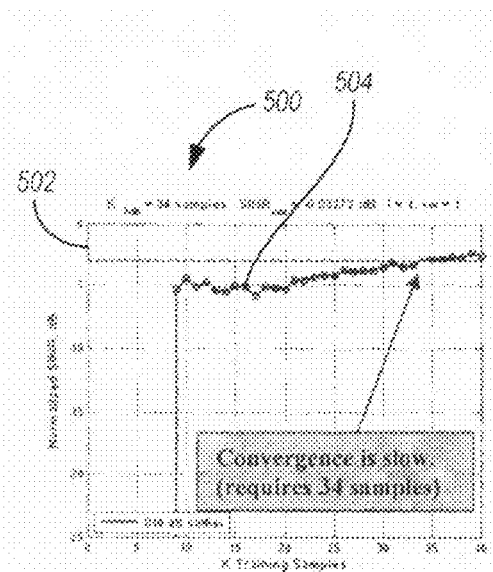
FIG. 5A is a prior art graph of the standard MWF processor convergence without the soft weighting or reiteration algorithms applied.
Figure 5B:
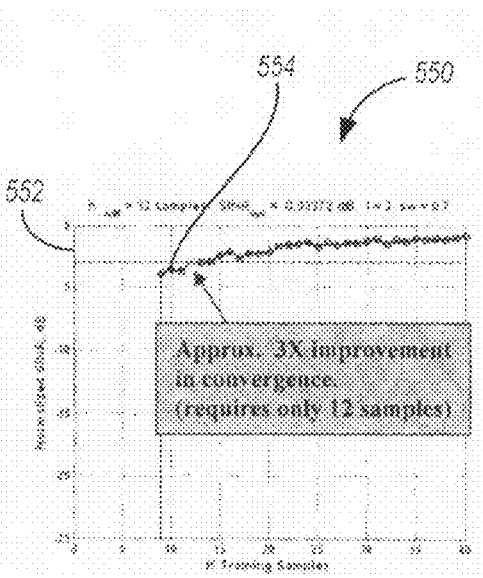
FIG. 5B is a graph of the MWF processor convergence with soft-weighting and three iterations.

As is described with reference to FIGS. 5A and 5B, the statistical convergence of the processor is improved. FIGS. 5A and 5B are graphical demonstrations of an antenna array of twenty (20) antennae and five (5) barrage jammers. The graphs are plots of the average performance when random data samples are input into the processor. The convergence graph 500, the number of training samples compared with the normalized SINR, for a prior art MWF without the application of a soft weight value or reiteration is shown in FIG. 5A. To achieve a convergence 502 of −3 dB, the MWF requires thirty-four (34) training samples 504. In comparison, FIG. 5B is a graphical demonstration 550 of the same system with the soft weighting and reiteration applied and using the same input data. The convergence 552 to the −3 dB range after applying the soft weight factor and reiterative processing to the MWF is drastically reduced for the same system and input data. The application of the invention requires only twelve (12) training samples 554 for the system. When the number of antennae in the array increases, the number of training samples required is reduced from the number that would be required without using soft weights and reiteration.

Figure 6A:
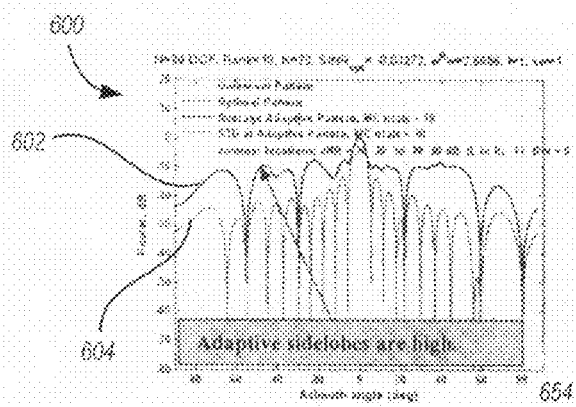
FIG. 6A shows a prior art graph of the sidelobe levels of an MWF adaptive signal processor, with no soft weighting and reiteration algorithms applied, compared with the optimum, desired levels.
Figure 6B:
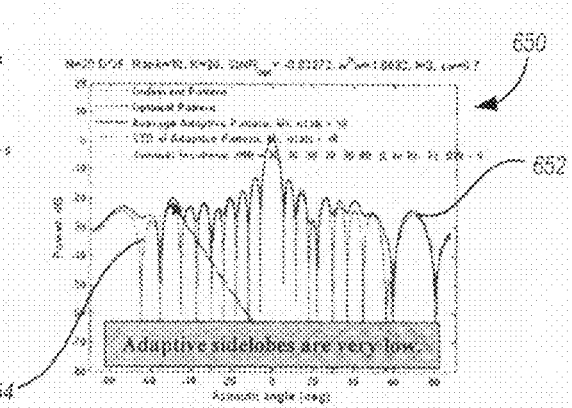
FIG. 6B shows a graph of the sidelobe levels of an MWF adaptive signal processor, with soft weighting and reiteration algorithms applied, compared with the optimum, desired levels.

FIGS. 6A and 6B are graphical representations of the adaptive sidelobe pattern improvements of the soft weighting and reiterative algorithms as applied to the traditional MWF. The graphs are plots of the average performance when random data samples are input into the processor. The graph represents array gain patterns as a function of the azimuth angle relative to the antenna array axis. As shown in FIG. 6A, the prior art graph 600 of the sidelobes 602 for the MWF without application of the reiterative and soft weighting algorithms are substantially higher than and divergent from the optimum 604. FIG. 6B is the resulting graph 650 of the sidelobes 652 after the soft weighting and reiterative algorithms have been applied. As can be seen, the sidelobe pattern nearly matches the optimum 654 levels. This reduction of the sidelobe levels reduces the amount of uncancelled interference passed on by the filters and greatly reduces the number of false alarms.

As will be understood by one of ordinary skill in the art, the preferred embodiments may be applied as a method, as a system, or as an apparatus. When incorporated into a system, a controller may be necessary to operate the invention. An illustrative controller may be a computer capable of receiving and storing electronic data, performing algorithmic or other computational functions, and/or storing the results of a particular algorithm. One of ordinary skill in the art will appreciate the computational requirements of a controller necessary to implement the system. The controller may contain, or be electronically connected to, an electronic memory storage device capable of storing electronic data in magnetic or any other electronic format, such as flash memory, that it is accessible by the controller or any other processor. The system may also have output means such as a printer, screen, or any other output device that may output the results of the invention in a readable manner.

The invention may also be implemented as a stand-alone apparatus composed of integrated circuits or other processors, as well as memory for electronic storage. Such an apparatus may also include, as a separate unit or integrated into the processor, a soft weight value generator which selects a soft weight value to be applied to an adaptive signal processor in accordance with the present invention.

The invention has been described with reference to certain preferred embodiments thereof. It will be understood to those skilled in the art, however, that modification and variations are possible within the scope of the appended claims.

What is claimed is:

1. A method of training an adaptive signal processor for filtering interference and noise from an input signal received by the adaptive signal processor, which comprises a plurality of building blocks, each building block comprising an adaptive weight value, the method comprising:
   i) receiving, by the adaptive signal processor, an input signal comprising a plurality of measurements, z and x, in an interference plus noise data environment;
   ii) applying, by each of the plurality of building blocks of the adaptive signal processor, a soft weight complex scalar value, $w_{sw}$, to each of the plurality of measurements, the soft weight value multiplied with the adaptive weight value, $w_g$, thereby modifying the adaptive weight value;
   iii) outputting, by the adaptive signal processor, a main channel column output, y, comprising the weighted plurality of measurements in accordance with the equation $y = z - (w_{sw} * w_g) * x$;
   iv) squaring, by the adaptive signal processor, the main channel column output of the adaptive signal processor for each of the plurality of measurements;
   v) determining, by the adaptive signal processor, a representative average value of the squared values; and
   vi) performing each of steps i) through v), by the adaptive signal processor, the performing step comprising:
      verifying, when the representative average value is within a pre-determined signal to power plus noise ratio [SINR]; and
      upon a positive verification that the representative average value is within a pre-determined signal to power plus noise ratio [SINR], counting the number of iterations of steps i) through v), whereupon, when the count is less than 2N training samples, N being the number of degrees of freedom of the adaptive signal processor, the performing step is concluded and the adaptive signal processor is now trained to filter between interference and noise of an input signal.

2. The method according to claim 1 wherein applying the soft weight value includes determining the soft weight value.

3. The method according to claim 2 wherein determining the soft weight value further comprises the steps of:
   i) selecting a value;
   ii) generating a data set of training values;
   iii) providing an adaptive signal processor simulator;
   iv) putting the training values into the simulator;
   v) inputting the selected value into the simulator;
   vi) measuring a signal power output value of the simulator;
   vii) varying the selected value; and
   viii) repeating steps i)-vii) until the measured difference in signal power output value between each preceding iteration is about 1 dB.

4. The method according to claim 3, wherein varying the selected value further comprises choosing the selected value from the range 0 to 2, excluding a value of 1.

5. The method according to claim 4 wherein the selected value is the soft weight value.

6. The method according to claim 3 wherein generating a data set of training values further comprises producing a first data matrix of size defined by a number of degrees of freedom [N] of a sensor input array and twice a minimum expected effective rank, [$R_{min}$], corresponding to a simulated interference plus noise environment.

7. The method according to claim 3 wherein generating a data set of training values further comprises producing a second data matrix of size defined by a number of degrees of freedom [N] of a sensor input array and twice a maximum expected effective rank, [$R_{min}$], corresponding to a simulated interference plus noise environment.

8. Tire method according to claim 3 wherein the soft weight value is selected such that the pre-determined average value is a signal to power plus noise ratio [SINR] within 3 dB from optimal normalized SINR of 0 dB, the soft weight value selected in less than 2N training samples, where N is the number of degrees of freedom.

9. The method according to claim 3 wherein the simulator simulates a cascaded canceller.

10. The method according to claim 9 wherein the cascaded canceller comprises a pseudo-median cascaded canceller.

11. The method according to claim 10 wherein at least one adaptive weight of the pseudo-median cascaded canceller is multiplied by the selected value.

12. The method according to claim 9 wherein the cascaded canceller comprises a Gram-Schmidt cascaded canceller algorithm.

13. The method according to claim 12 wherein the one or more adaptive weight values is a Gram-Schmidt weight value, and at least one Gram-Schmidt weight value of the Gram-Schmidt cascaded canceller is multiplied by the selected value.

14. The method according to claim 9 wherein the cascaded canceller comprises a generic cascaded canceller algorithm.

15. The method according to claim 14 wherein at least one adaptive weight value of the generic cascaded canceller is multiplied by the selected value.

16. The method according to claim 9 wherein the cascaded canceller comprises a multi-stage median cascaded canceller algorithm.

17. The method according to claim 16 wherein at least one adaptive weight value of the multi-stage median cascaded canceller is multiplied by the selected value.

18. The method according to claim 3 wherein the simulator simulates a Multi-Stage Weiner Filter algorithm.

19. The method according to claim 18 wherein the Multi-Stage Weiner Filter comprises a plurality of stages such that the number of stages is selected to be equal to an effective rank of an interference environment.

20. The method according to claim 18 wherein the Multi-Stage Weiner Filter comprises a plurality of stages such that the number of stages is selected to be greater than a minimum effective rank of an interference environment.

21. The method according to claim 18 wherein the Multi-Stage Weiner Filter comprises a plurality of stages such that the number of stages required for optimal convergence is less than the number of degrees of freedom.

22. The method according to claim 18 wherein the one or more adaptive weight values is a Weiner weight value, and at least one Weiner weight value is multiplied by the selected value.

23. The method according to claim 18 wherein the one or more adaptive weight values is a Gram-Schmidt weight value, and at least one Gram-Schmidt weight value is applied in the synthesis stage.

24. The method according to claim 18 wherein the one or more adaptive weight values is a Gram-Schmidt weight value, and at least one Gram-Schmidt weight value is multiplied by the selected value.

25. The method according to claim 3 wherein the soft weight value is increased until the measured signal power output value reaches an unacceptable limit.

26. A system for reiteratively applying a soft-weight value, comprising:
a plurality of sensor inputs for measuring signals within an interference plus noise environment with a variable effective rank;
a filter comprising an adaptive signal processor;
a controller to perform the following steps:
input the measured signals, x and z, into the filter;
determining y, in accordance with the following equation: $y=z-(w_{sw}*w_g)*x$, wherein x and z are input signals, $w_g$ is conjugated adaptive weight value, $w_{sw}$ is representative of the soft weight complex scalar value
applying a soft weight value $w_{sw}$ to the filter, the soft weight value modifying one or more existing adaptive weight values $w_g$ associated with the filter;
outputting, y of the adaptive signal processor in accordance with the equation $y=z-(w_{sw}*w_g)*x$;
a memory means, wherein the controller retrieves from the memory means a stored number of iterations, such that the operations of the controller are performed a number of times as specified by the number of iterations; and
an output means.

27. The system according to claim 26 wherein a plurality of degrees of freedom provided by the sensor inputs provides the measured target signals.

28. The system according to claim 26 wherein the memory means has stored upon it a number of iterations.

29. The system according to claim 28 wherein the controller retrieves from the memory means a stored number of iterations, such that the measured signals are input into the filter a number of times as specified by the number of iterations.

30. The system according to claim 26 wherein the adaptive signal processor is a Gram-Schmidt Cascaded Canceller.

31. The system according to claim 30 wherein the one or more adaptive weight values is a Gram-Schmidt weight value, and the controller applies the soft weight value by multiplying at least one Gram-Schmidt weight value of the Gram-Schmidt cascade canceller by the soft weight value.

32. The system according to claim 26 wherein the adaptive signal processor is a multi-stage median cascaded canceller one or more adaptive weight values.

33. The system according to claim 32 wherein the controller applies the soft weight value by multiplying at least one adaptive weight value of the multi-stage median cascaded canceller by the soft weight value.

34. The system according to claim 26 wherein the adaptive signal processor is a generic cascaded canceller comprising one or more adaptive weight values.

35. The system according to claim 34 wherein the controller applies the soft weight value by multiplying at least one adaptive weight value of the generic cascaded canceller by the soft weight value.

36. The system according to claim 26 wherein the adaptive signal processor is a pseudo-median cascaded canceller comprising one or more adaptive weight values.

37. The system according to claim 36 wherein the controller applies the soft weight value by multiplying at least one adaptive weight value of the pseudo-median cascaded canceller by the soft weight value.

38. The system according to claim 26 wherein the adaptive signal processor is a Multi-Stage Weiner filter comprising one or more adaptive weight values.

39. The system according to claim 38 wherein the Multi-Stage Weiner filter comprises a pre-determined number of stages.

40. The system according to 38 wherein the Multi-Stage Weiner Filter comprises a plurality of stages such that the number of stages is selected to be equal to an effective rank of an interference plus noise environment.

41. The system according to claim 38 wherein the Multi-Stage Weiner Filter comprises a plurality of stages such that the number of stages is selected to be greater than a minimum effective rank of an interference plus noise environment.

42. The system according to claim 38 wherein the Multi-Stage Weiner Filter comprise a plurality of stages such that the number of stages required for optimal convergence is less than the number of degrees of freedom.

43. The system according to claim 38 wherein the controller applies the soft weight value by multiplying at least one Weiner weight value of the Multi-stage Weiner Filter by the soft weight value.

44. The system according to claim 38 wherein the one or more adaptive weight values is a Gram-Schmidt weight value, and at least one Gram-Schmidt weight value is applied to the synthesis stage.

45. The system according to claim 44 wherein the one or more adaptive weight values is a Gram-Schmidt weight value, and the controller applies the soft weight value by multiplying at least one Gram-Schmidt weight value of the Multi-stage Weiner Filter by the soft weight value.

46. A method for adaptive signal processing, by an adaptive signal processor, the method comprising:

measuring, by one or more sensors of the adaptive signal processor, a signal comprising a plurality of measurements, z and x, in an interference plus noise environment;

inputting the measured signal into an adaptive signal processor wherein a controller retrieves from a memory means a stored number of iterations, such that the operations of the adaptive signal processor are performed a number of times as specified by the number of iterations;

filtering, by the adaptive signal processor, the measured signal to eliminate interference;

applying, by the adaptive signal processor, a soft weight to the algorithm, the soft weight value modifying one or more existing adaptive weight values associated with the adaptive signal processor in accordance with the following equation: $y=z-(w_{sw}*w_g)*x$, wherein $w_g$ is adaptive weight value, $w_{sw}$ is representative of the soft weight complex scalar value; and outputting, by the adaptive signal processor, the filtered and weighted signal, y.

47. The method of claim 46, wherein the measured signal comprises a target signal, an additive noise, and an interference.

48. The method of claim 46, wherein the filtering comprises a cascaded algorithm.

49. The method of claim 48 wherein the cascaded canceller algorithm is a Gram-Schmidt cascaded canceller algorithm.

50. The method of claim 49 wherein the one or more adaptive weight values is a Gram-Schmidt weight value, and applying the soft weight value further comprises multiplying the Gram-Schmidt weight value by the soft weight value.

51. The method of claim 48 wherein the cascaded canceller algorithm is a pseudo-median cascaded canceller algorithm.

52. The method of claim 51 wherein applying the soft weight value further comprises multiplying the one or more adaptive weight values by the soft weight value.

53. The method of claim 48 wherein the cascaded canceller algorithm is a multistage median cascaded canceller.

54. The method of claim 53 wherein applying the soft weight value further comprises multiplying the one or more adaptive weight values by the soft weight value.

55. The method of claim 48 wherein the cascaded canceller algorithm is a generic cascaded canceller algorithm.

56. The method of claim 55 wherein applying the soft weight value further comprises multiplying the one or more adaptive weight values by the soft weight value.

57. The method of claim 46 wherein the filtering comprises a Multi-Stage Weiner Filter algorithm.

58. The method of claim 57 wherein the one or more adaptive weight values is a Weiner weight value, and applying the soft weight value further comprises multiplying the Weiner weight value by the soft weight value.

59. The method of claim 57 wherein the filtering further comprises applying at least one Gram-Schmidt weight in the synthesis stage.

60. The method of claim 59 wherein applying the soft weight value further comprises multiplying the Gram-Schmidt weight by the soft weight value.

61. The method of claim 46 wherein the applying a soft weight value further comprises selecting a soft weight value between 0 and 2, excluding a value of 1.

62. The method of claim 46 wherein applying the soft weight value further comprises selecting a soft weight value such that the pre-determined average value is a signal to power plus noise ratio [SINR] within 3 dB from optimal normalized SINR of 0 dB, the soft weight value selected in less than 2N training samples, where N is the number of degrees of freedom.

63. An adaptive signal processor comprising:
a filter;
a controller for retrieving from a memory means a stored number of iterations, such that operations of the controller, the operations of the adaptive signal processor, and the operations of a soft weight generator are performed a number of times as specified by the number of iterations;
a soft weight generator for modifying one or more adaptive weight values associated with the adaptive signal processor; and
an output y, determined in accordance with the following equation: $y=z-(w_{sw}*w_g)*x$,
wherein x and z are input signals, including the measured signal, into the filter, $w_g$ is conjugated adaptive weight value, $w_{sw}$ is representative of the soft weight complex scalar value.

64. The adaptive signal processor of claim 63 wherein the filter further comprises an input from the soft weight generator.

65. The adaptive signal processor of claim 64 wherein the soft weight generator generates a soft weight value between 0 and 2, excluding a value of 1.

66. The adaptive signal processor of claim 63, wherein the filter further comprises a cascaded canceller that applies the soft weight value.

67. The adaptive signal processor of claim 66 wherein the cascaded canceller further comprises a Gram-Schmidt cascaded canceller.

68. The adaptive signal processor of claim 67 wherein the one or more adaptive weight values is a Gram-Schmidt weight value, and applying the soft weight value further comprises multiplying the Gram-Schmidt weight value by the soft weight value.

69. The adaptive signal processor of claim 66 wherein the cascaded canceller further comprises a pseudo-median cascaded canceller.

70. The adaptive signal processor of claim 69 wherein applying the soft weight value further comprises multiplying the one or more adaptive weight values by the soft weight value.

71. The adaptive signal processor of claim 66 wherein the cascaded canceller further comprises a median multi-stage cascaded canceller.

72. The adaptive signal processor of claim 71 wherein applying the soft weight value further comprises multiplying the one or more adaptive weight values by the soft weight value.

73. The adaptive signal processor of claim 66 wherein the cascaded canceller further comprises a generic cascaded canceller.

74. The adaptive signal processor of claim 73 wherein applying the soft weight value further comprises multiplying the one or more adaptive weight values by the soft weight value.

75. The adaptive signal processor according to claim 65 wherein the filter comprises a Multi-stage Weiner filter that applies the soft weight value.

76. The adaptive signal processor of claim 75 wherein the Multi-Stage Weiner Filter comprises a plurality of stages such that the number of stages is selected to be equal to an effective rank of an interference plus noise environment.

77. The adaptive signal processor of claim 75 wherein the Multi-Stage Weiner Filter comprises a plurality of stages such that the number of stages is selected to be greater than a minimum effective rank of an interference plus noise environment.

78. The adaptive signal processor of claim 75 wherein the Multi-Stage Weiner Filter comprises a plurality of stages such that the number of stages required for optimal convergence is less than the number of degrees of freedom.

79. The adaptive signal processor of claim 75 wherein the one or more adaptive weight values is a Gram-Schmidt weight value, and at least one Gram-Schmidt weight value is applied in the synthesis stage.

80. The adaptive signal processor of claim 79 wherein the one or more adaptive weight values is a Gram-Schmidt weight value, and applying the soft weight value further comprises multiplying the Gram-Schmidt weight value by the soft weight value.

81. The adaptive signal processor of claim 75 wherein the one or more adaptive weight values is a Weiner weight value, and applying the soft weight value further comprises multiplying the Weiner weight value by the soft weight value.

82. The adaptive signal processor of claim 65 wherein the soft weight value is selected such that the pre-determined average value is a signal to power plus noise ratio [SINR] within 3 dB from optimal normalized SINR of 0 dB, the soft weight value selected in less than 2N training samples, where N is the number of degrees of freedom.

* * * * *